United States Patent [19]

Barrick et al.

[11] 4,172,255
[45] Oct. 23, 1979

[54] HF COASTAL CURRENT MAPPING RADAR SYSTEM

[75] Inventors: Donald E. Barrick, Boulder; Michael W. Evans, Longmont, both of Colo.

[73] Assignee: The United States of America as represented by the Secretary of the Interior, Washington, D.C.

[21] Appl. No.: 822,868

[22] Filed: Aug. 8, 1977

[51] Int. Cl.$^2$ ............................................. G01S 9/44
[52] U.S. Cl. .................. 343/5 W; 343/9 R; 73/189; 343/7.7
[58] Field of Search ............... 73/170 A, 188, 189; 343/5 R, 5 W, 5 CE, 9, 7.7, 15

[56] References Cited

U.S. PATENT DOCUMENTS

| | | | |
|---|---|---|---|
| 3,889,533 | 6/1975 | Balser | 73/189 |
| 3,949,605 | 4/1976 | Stallworth et al. | 73/189 |
| 4,053,886 | 10/1977 | Wright et al. | 343/5 W |

OTHER PUBLICATIONS

"HF Radio Measurements of Surface Currents", by Stewart and Joy, *Deep-Sea Research*, 1974, vol. 21, pp. 1039-1049, Great Britain.

Barrick et al., "Sea Backscatter at HF . . .", *Proceedings of the IEEE*, vol. 62, No. 6, Jun. 1974, pp. 673-680.

*Primary Examiner*—Maynard R. Wilbur
*Assistant Examiner*—Lawrence Goodwin
*Attorney, Agent, or Firm*—Gersten Sadowsky; Donald A. Gardiner

[57] ABSTRACT

A system for radar remote sensing of near surface ocean currents in coastal regions. The system employs a pair of low power, transportable high frequency radar units to scatter signals from the shore off to the ocean waves. Underlying surface currents impart a slight change in velocity to the ocean waves which is detected by the radar units. Each radar unit can determine the angular direction of arrival of the radar echo signals by comparing the phase of the signals received at three short antennas on the shore. Signals scattered from the same point on the ocean by each of the two geographically separated radar units are used to construct a complete current vector for that point. The radar pair takes simultaneous measurements over an ocean area with a predetermined grid pattern. Vectors are constructed for each square section of the grid, and a map of the near surface current field is output in real-time by an on-site minicomputer.

5 Claims, 7 Drawing Figures

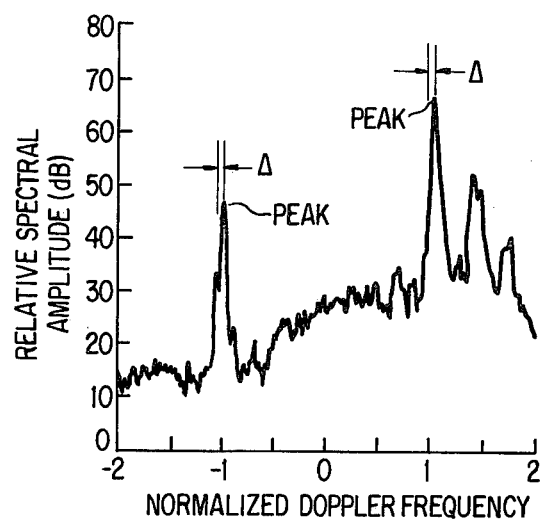
FIG.1
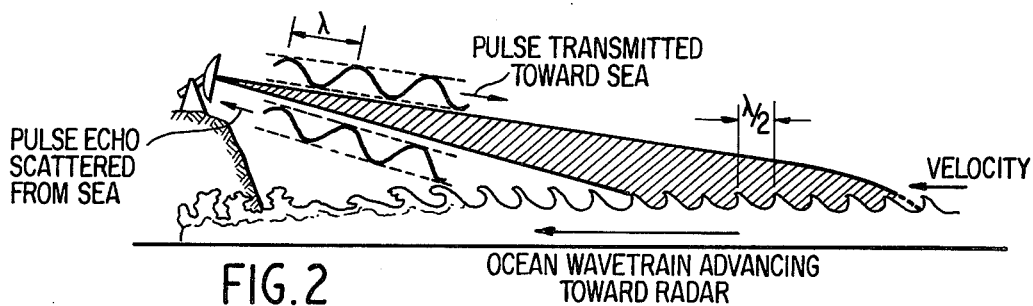
FIG.2
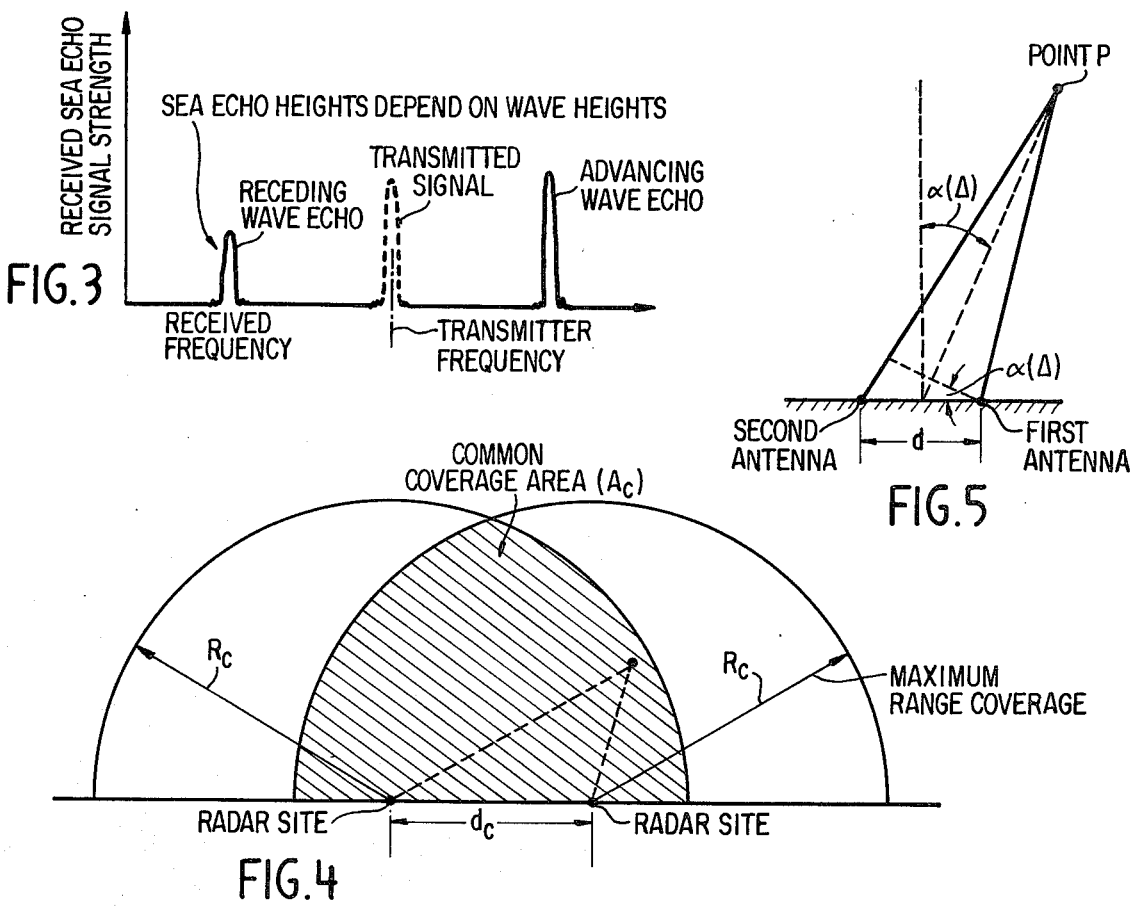
FIG.3
FIG.5
FIG.4

HF COASTAL CURRENT MAPPING RADAR SYSTEM

ORIGIN OF THE INVENTION

The invention described herein was made by employees of the United States Government and may be manufactured and used by or for the Government for governmental purposes without the payment of any royalites thereon or therefor.

BACKGROUND OF THE INVENTION

1. Field of the Invention

The present invention relates to oceanographic measuring systems, and more particularly to surface current mapping systems.

2. Description of the Prior Art

Surface currents are defined as the means horizontal flow of water within the uppermost layer of the ocean. The thickness of this layer can be nominally taken as 20 to 50 centimeters. On the open oceans, the height of the waves present will almost always be many times greater than the thickness of this top layer; in addition, the phase velocities of these waves will also be much larger than the speed of the mean surface currents (e.g., 10 to 100 times greater). Because of these two facts, the moored current meter—which is used successfully at greater depths—is relatively useless for measuring surface currents.

Yet the currents in the uppermost layer of the ocean are of great importance, especially in near coastal regions. Anything that floats on the surface is transported by these currents, waves notwithstanding. Thus the trajectory and fate of an oil spill or a leak from an offshore rig will depend upon the patterns of the near surface currents in the area, as will the destination of hot water and pollutant effluents discharged near the shore. The rescue of a person in the water, especially in conditions of poor visibility, could be aided considerably by real time observations of surface currents over the area and relevant trajectory predictions.

Nearly all available techniques for measuring these near-surface currents are Lagrangian in nature, meaning that they measure the trajectory of a parcel of water near the surface, thus obtaining one or more current streamlines vs. time. The most common technique consists of visualy or photographically observing a dye marker's dispersal or the movement of timed release floats from an airplane. Such experiments are expensive and hence limited in area and time. Drogued free floating buoys, tracked either by by radar or optically from land, ship, and possibly in the future by satellite represent an alternative technique. Satellite tracking of several such buoys will ultimately provide valuable information on general oceanic circulation patterns and thence, surface wind and ocean/atmosphere energy exchange, but can hardly be useful for the finer grid-scale requirements for coastal waters over the continental shelves.

Observation of sea echo with HF radar has been employed as a method for measuring surface current features. HF, as considered here, extends from the broadest band to VHF, including radar wavelengths between 10 and 200 m. Although the heights of ocean waves are generally small in terms of these radar wavelengths, the scattered echo is nonetheless surprisingly large and readily interpretable in terms of its Doppler features. Sea currents are evident in the records as an overall offset of the Doppler peaks from their expected (normalized) positions at ±1. *Barrick et al.* in Proc. IEEE, Vol. 62, pp. 673– 680 and *Stewart and Joy* in Deep Sea Research, Vol. 21, pp. 1039–1049 have shown that the radial component of surface current, that is, the apparent surface current magnitude observed along the direction of a fairly narrow azimuthal radar beam, can be measured to a reasonable precision. A long, 800 foot, antenna array was used to form the beam so that the azimuthal direction of arrival could be assumed to be the same as that of the transmitted beam. The complete surface current vector could not be determined by this method. Also, these prior efforts did not permit real-time determination of the surface current since the data was recorded in the field and analyzed later.

SUMMARY OF THE INVENTION

Accordingly, an object of this invention is to provide an improved system for measuring and mapping surface currents in coastal regions.

It is another object of this invention to provide such a system which is capable of measuring the complete current vector, rather than a single component thereof.

It is a further object of the present invention to provide such a system which can produce a surface current vector map in real-time in the field.

It is yet another object of the present invention to provide such a system which is compact and easily transportable.

The objects of the present invention are achieved by apparatus for mapping surface current velocity vectors in coastal waters. The apparatus comprises a pair of radar transceivers positionable at two spaced apart sites for scattering signals off waves at a point where a surface current vector is to be determined; at least three spaced apart receiving antennas at each of the two sites for locating the point relative to the two spaced apart sites; and digital processing units for determining the surface current vector components radial to each of the sites from the Doppler echos of the scattered signals and mapping the complete surface current vectors in real-time.

Another aspect of the present invention involves a method of mapping surface current vectors in coastal waters. The method includes the steps of selecting a point where the surface current vector is to be determined; scattering radio signals off waves at the point from two spaced apart radar sites to produce Doppler echos at each site; and measuring the surface current-produced component of the Doppler shift of the echos at each of the two radar sites. The method further includes the steps of determining the respective surface current vector components radial to each of the two radar sites from the measured Doppler shift components; locating the point relative to each of the two radar sites; and combining the respective radial surface current vector components trigonometrically to extract the complete surface current velocity vector at the point.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 1 is a plot of a typical radar sea-echo Doppler spectrum.

FIG. 2 is a schematic diagram for explaining the principles of the present invention.

FIG. 3 is a schematic plot of the radar sea-echo Doppler spectrum.

FIG. 4 is a schematic illustration of the simplest radar site geometry of the present invention.

FIG. 5 is a schematic illustration of the simplest geometry of the antenna placement in the present invention.

DETAILED DESCRIPTION OF THE INVENTION

Figure 6:
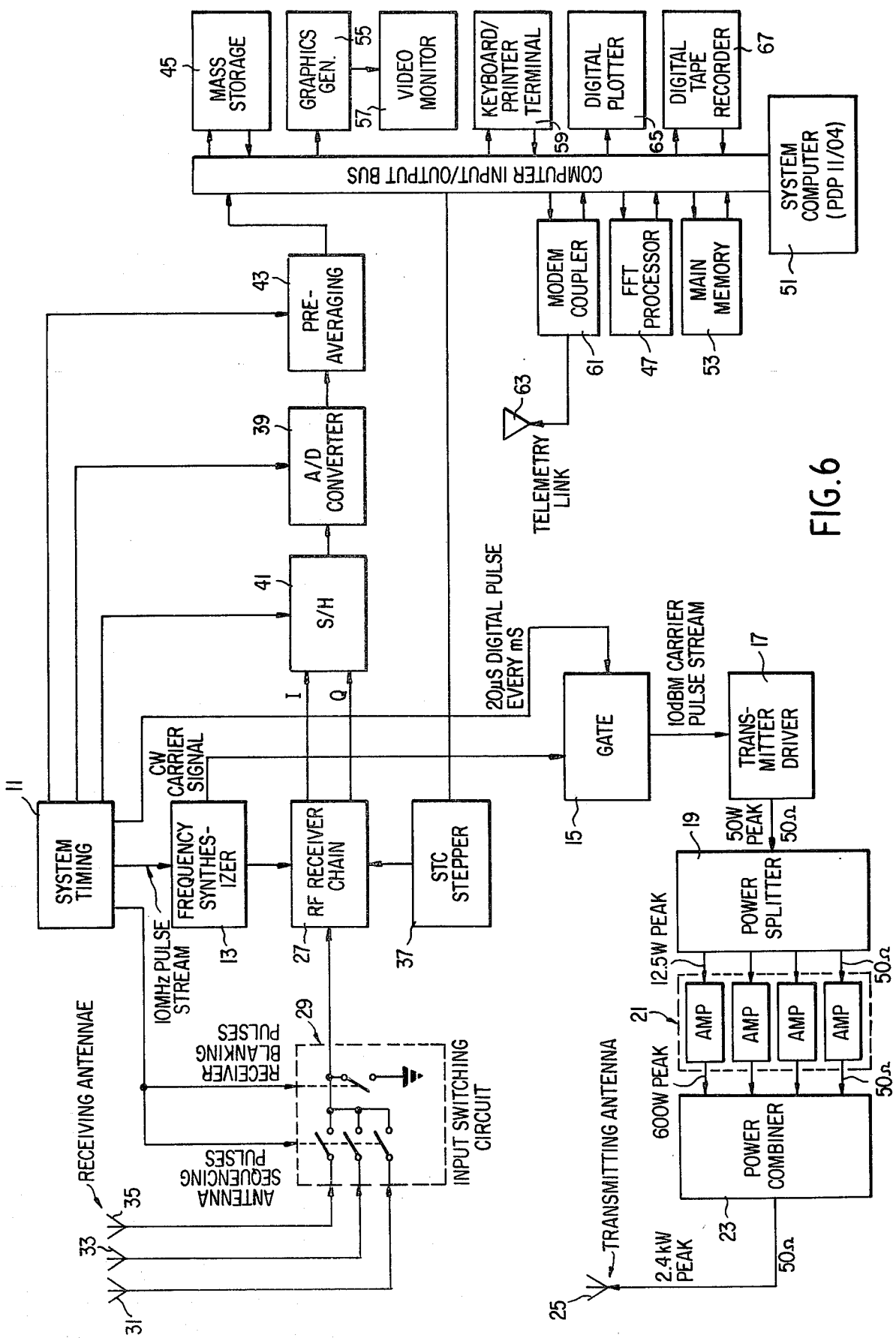
FIG. 6 is a schematic block diagram of a current mapping radar unit as would be utilized at each of the two coastal stations in the present invention.

Before entering into the detailed description of one embodiment of the present invention according to the accompanying Figures of the drawing, the theory of the present invention will be explained in detail hereinafter.

Scattering of short radio waves from the surface of the sea back to their source has been observed since the earliest days of radar. If one illuminates the sea, using vertically polarized signals at frequencies of a few MHz to avoid horizon distance limitations and observes the resultant backscattered signals, three features are observed. First, there are two echos each having a width of 0.01-0.005 Hz. This is a remarkably narrow spectrum as compared to what one might intuitively expect of signals scattered from such an irregular and changing surface as the sea. Second, each echo is slightly offset in frequency about the frequency of the transmitted signal. Finally, the magnitude of the echos is quite large, impluging that the scattering cross section of the sea is also large. An example of a typical backscatter spectrum is shown in FIG. 1, and illustrates the first two of these points. The transmitter frequency appears at center, with ±1 corresponding to the echos.

Referring to FIGS. 2 and 3, the observations can be explained with the following hypothesis. The sea is considered to be made up of many components long crested sinusoidal gravity waves travelling in a wide range of directions. Some of these have a length, L, which is half the radio wavelength, $\lambda$. Of these, some will be travelling radially toward, and some will be travelling radially away from, the transmitter and receiver. Only these will scatter the incident signal backwards since the signals scattered from successive crests separated by a distance $L=\lambda/2$ will add in phase in the direction of the receiver. The sea wave components travelling in non-radial directions will not scatter energy towards the receiver because the component waves have infinite crest lengths and thus the scattering polar diagram will be of zero width. Because the component waves of resonant length, $L=\lambda/2$, travel with a velocity v whose magnitude is given by $$v = \sqrt{gL/2\pi}$$

in deep water, the backscattered signals undergo a Doppler shift in frequency, $$\delta f = \pm 2v/\lambda = \pm \sqrt{g/\pi\lambda}$$

where g is the acceleration of gravity. The plus and the minus sign refer respectively to signals backscattered by waves travelling radially toward, and to signals backscattered by waves travelling radially away from, the transmitter and receiver. This accounts for the observed frequency shifts. Moreover, it can be shown that this Doppler shift is precisely equal to the frequency of the gravity waves of resonant length on the surface of the sea. The component seawaves extend over considerable distances and thus a large number contribute to the received signal. This qualitatively explains the relatively large cross section which is observed.

Information about ocean surface currents can also be extracted from the sea echo Doppler spectrum. The Doppler echo peaks are often observed to be shifted equally by a small amount (see FIG. 1) from the positions predicted by the above hypothesis. This implies that the waves causing resonant scattering are superimposed on a sea surface which is physically moving due to surface currents. The radial component of this surface current vector can thus be calculated in terms of the translation from the predicted Doppler echo position to be $u = v\Delta$ where $\Delta$ is the normalized translation from the predicted Doppler echo position arising from the surface current vector as measured in FIG. 1 and the velocity v is defined above.

Thus, by measuring the total Doppler shift (and hence the total radial ocean-wave velocity), and knowing precisely the velocity v of the waves of resoant length, one can determine the radial component of surface current at any point P.

In order to construct a map of current vectors representing the surface current, radar sea echo signals must be processed in a special manner. Signals from two coastal stations separated by tens of kilometers are required to obtain a complete horizontal vector at any point, since those from one station alone can provide only the surface current vector component radial to that station. Referring to FIG. 4, the simplest site geometry is illustrated where the two radar units are located on a straight shoreline, separated by a spacing $d_c$. As far as construction of the map is concerned, radar-deduced surface current vectors can be plotted only in the common region seen by the radar units; this area is contained within overlapping circles of radius $R_c$, the coverage range, centered on each site. The common coverage area $A_c$, above the shoreline is shown shaded.

Three basic quantities, then, are needed from each of the two stations to produce a surface current map: (i) the range r to the scattering point P at which the surface current vector is desired; (ii) the azimuthal angle $\alpha$ to the point P from a specified direction; (iii) the radial component of surface current u at the point P. The first two quantites (r, $\alpha$) pinpoint the geographical source of the echo, and the third (u) represents the desired geophysical quantity to be extracted from the echo.

The range r, or distance to the scattering point, is determined from the two-way propagation time of the signal; in other words, the time of pulse transmission is noted, and the time of receipt of the echo thereafter is directly proportional to the distance of the scattering point from the radar station of interest. The entire coverage area $A_c$ can be mapped by gating the signals at progressively larger ranges from the radar station, that is, by sampling the echos vs time after transmission. The sequential time signals are referred to as "range gates". Each of the sequential time samples represents the echo from a scattering cell having an annular finite radial width δr. This width is called the "range resolution", and the scattering cell is called a "range resolution cell".

Referring to FIG. 5, the azimuthal angle of arrival $\alpha$ of the signal from a given range gate can be determined from the phase difference between the signals received at multiple antennas at the same translation $\Delta$ from the predicted Doppler echo position. For two antennas parallel to the beach, this phase difference is $\Phi(\Delta) = k_o d \sin \alpha(\Delta)$, where $k_o = 2\pi/\lambda$ ($\lambda$ is the radar wavelength, d is the distance between the two antennas, and $\alpha(\Delta)$ is the angle-of-arrival from the perpendicular to the beach baseline). In order that the relationship between $\alpha$ and $\Phi$ be unambiguous as $\alpha$ goes from $-90°$ to $+90°$, it is necessary that d be less than $\lambda/2$. A uniform current flow perpendicular to the beach, however, will produce a double-valued Doppler pattern, and with only two antennas, it will not be possible to distinguish the echo signal at $-\alpha_1$ from that at $+\alpha_1$. This double-valued ambiguity can be resolved by using three receiving antennas and solving two sets of equations, each one for a given pair of antennas, in two unknowns. While only the case of three antennas will be discussed here, it will be appreciated that triple or higher valued current ambiguities can be resolved by using four or more receiving antennas.

The range r and azimuth $\alpha$ of a given sea echo signal sample having been determined, the surface current vector component at this point oriented in the direction of the radar station is obtained in terms of the translation from the predicted Doppler echo position $\Delta$ as $u_{1,2} = v_{1,2}\Delta$, where the subscripts refer to the radar station at which the observations are made. Then the total current vector at the corresponding grid point P is determined as the trigonometric combination of the two radial components for point P.

Referring now to FIG. 6, there is shown a block schematic diagram of a current mapping radar unit as would be utilized at each of the two coastal stations.

First, the transmitting portion of the current-mapping radar unit will be described. A system timing circuit 11 generates a 10 MHz bit stream which it transmits to a frequency synthesizer 13, and digital pulsing/gating signals (20 µs. wide, at a 1 kHz rate) which it transmits to a sampling gate 15. The system timing circuit 11 can be for example a temperature-controlled 10.0 MHz Hewlett-Packard oscillator having a drift less than one part in $10^{11}$ (within one second) in combination with conventional digital dividers and combinatorial logic. The frequency synthesizer 13 divides the 10 MHz frequency down to 200 kHz, and then multiplies it back up again to arrive at the system operating frequency between 25 and 35 MHz selected by the operator. The CW signal from the frequency synthesizer 13 then passes through the sampling gate 15, whose duration and timing is controlled digitally by the pulsing/gating signals from the system timing circuit 11. The gate 15 forms and shapes the pulse modulated carrier signal. The output of the gate is a $\pm 10$ dBm, 20 µs. wide RF pulse every millisecond at the selected operating frequency. This analog pulse stream is the basic transmitted signal. It is sent through a transmitter-driver 17 where it is amplified to a 50 watt peak-power level. The driver 17 can, for example, utilize three stages of broad band linear push-pull operators, operated "class AB". The output from the driver is then coupled to a 4:1 power splitter 19, which in turn is connected to the input of each of four final-power amplifiers 21. After recombination in a power combiner 23, the pulse signals are radiated at 2.4 kW peak (or 48 watts average level) through a short, semi-directive vertically-polarized Yagi monopole antenna array 25. All components after the sampling gate 15 are matched to 50 ohms for maximum power transfer.

Next, the receiving portion of the current-mapping radar unit will be described. The receiving antennas 31, 33 and 35 are connected sequentially to the RF receiver 27 during consecutive pulse transmissions. During radiation of each intense 20 µs wide transmitted pulse, a blanking signal from the system timing circuit 29 causes an input switching circuit 29 to disconnect the RF receiver 27 from the receiving antennas, and to short its input to ground. Then, 20–40 µs after the transmitted pulse is radiated an antenna sequencing pulse from the system timing circuit 29 causes the input switching circuit 29 to disconnect the RF receiver 27 input from ground and to connect it to the first receiving antenna 31. This antenna remains connected to the RF receiver 27 until the echo from the most distant patch of sea has been received (i.e., about 0.7 milliseconds after transmission). Then, antenna sequencing pulses from the system timing circuit 29 cause the input switching circuit 29 to sequentially connect the second and third receiving antennas 33 and 35 to the receiver 27 for similar periods, after which the process is repeated. Hence, each receiving antenna, acting alone, has an omni-directional azimuthal receiving pattern to permit determination of the direction of arrival of the echo from the phase differences between the signals at the three antennas. The receiving antennas are preferably short, high impedance elements—resembling the "vertical whip" automobile antennae-which can be erected and disassembled on a beach in a matter of minutes as can be transmitting antenna. Short, high impedance antenna elements keep the antenna currents very low, minimizing the undesired effects of mutual coupling between receiver elements and also with the transmitter antenna. The RF receiver 27 also receives digital signals from a conventional sensitivity-time control (STC) stepper 37. This causes attenuation of various levels to be inserted in the IF gain stages of the RF receiver 27 in a preprogrammed manner. The maximum intensity radar signals will be received immediately after transmission because of the extremely strong echos scattered at short ranges. Accordingly, the attenuation versus time after pulse transmission is programmed to decrease monotonically. This STC function is necessary to prevent saturation and non-linear effects since if compensation for range were not made, the desired echo signal dynamic range would greatly exceed the dynamic range of the analog-to-digital converter 39 which follows the RF receiver 27. The RF receiver forms an IF signal by mixing the received RF signal with a local oscillator signal generated by the frequency synthesizer 13. Two IF channels are employed: an "in-phase" channel (designted I) and a "quadrature" channel (designated Q). The signals through these channels are "balanced" to have the same amplitude, but are 90° out of phase with each other. This is one of the two conventional methods employed when Fourier transformation of the signal is ultimately to be performed; it allows the signal to be mixed to a "O-IF" before digitization, after which the signals from each channel form the real and imaginary arrays of the Fourier transform input. The Fourier transform output then contains signal power at both negative and positive Doppler shifts near DC. The 0 (or base band) IF signals out of the RF receiver chain have an information content approximately 1 Hz in bandwidth, because of the nature of the sea echo, even though the actual signal bandwidth is much greater. These analog signals are "sampled and held" every ten $\mu s$ in a sample-and-hold circuit 41. The aperture time is less than 2.0 ms, during which the signals are constant. These signals are then digitized in the analog-to-digital converter 39, and from this point on, all processing is digital in nature. Even though the signals are digitized every 10 $\mu s$, only every other sample is ultimately used; these ultimate digital samples thus each represent sea echo from consecutive 20 $\mu s$ range gates. Only signals from the first 32 range gates after every pulse transmission are retained from processing, even though there are actually 50 twenty $\mu s$ time intervals available between consecutive (every millisecond) pulse transmissions. Since consecutive pulses are received sequentially on each of the three antennas, it takes 3 ms for the signal in a given antenna to be sampled again. Hence $3 \times 32 = 96$ total samples for both the I and the Q channels are obtained every 3 ms. These signal samples then pass through a pre-averaging circuit 43 which pre-averages them for one-half second. In other words, for the I channel and the first antenna and, say range gate #7, two samples arriving every 3 ms for a total of ½ second are added together to form an average signal. Thus the digitization process (at a ⅓ kHz rate per range gate per antenna) and the preaveraging process effectively reduce the signal bandwith to two Hz (i.e., $-1$ Hz to $+1$ Hz), or about twice its intrinsic value for ultimate processing. For each of the 32 range gates, for each of the three antennas, and for both the I and the Q channels, there are therefore 167 pulses averaged to form $32 \times 3 \times 2 = 192$ digital samples every half second. Each of these 192 samples being obtained every 0.5 seconds is stored in a mass storage unit 45 for a total of 256 seconds until a total of $192 \times 256 / 0.5 = 98,304$ samples were collected. At this end of 256 seconds, each of the 96 I and Q channels has produced a time-series array of 512 digital samples, and these then ultimately become the real and imaginary parts of the input to a fast-Fourier transform (FFT) processor 47 which calculates 96 complex Fourier transforms, each of 512-word length, every 256 seconds.

The computer input/output bus 49 serves as the transfer point between digital hardware components for the processing of all digital data. The heart of all the digital processing and radar control programming is a minicomputer 51 which can be, for example, a model PDP 11/04 manufactured by the Digital Equipment Corporation, Inc. The computer main frame contains additional room for digital devices as illustrated. These include a main memory 53, a graphics generator 55 such as that manufactured by Intermedia Systems, Inc., and a rack-mounted video monitor 57 which could be a 10-inch Conrac scope monitor. The operator communicates with the radar system entirely through a keyboard/printer terminal 59, which can be for example a model 735 "Silence 700 Terminal" manufactured by Texas Instruments, Inc. Other digital components of the current-mapping radar unit can include a Modem Coupler 61, a telemetry link 63, a digital plotter 65, and a digital tape recorder 67.

Figure 7:
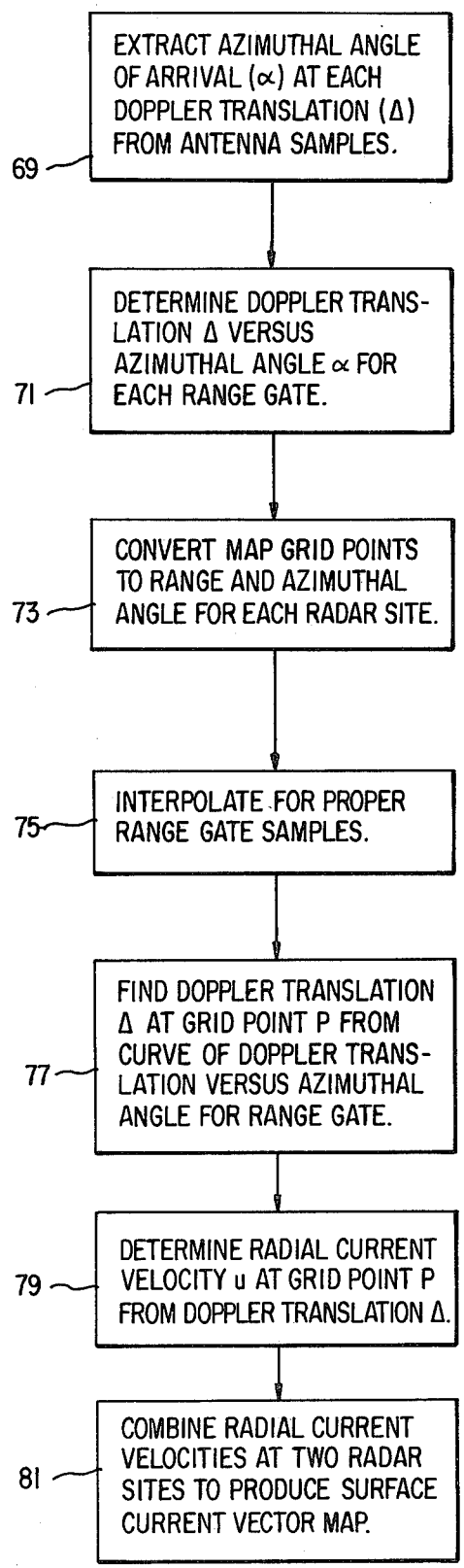
FIG. 7 is a flow chart of the processing steps in producing the current vector map.

After processing in the FFT processor 47, the data arrays are ready for the mathematical algorithms which extract the radial component of the surface current at each of the predetermined set of map grid points. Referring to the flow chart shown in FIG. 7, in the first step 69, the azimuthal angle-of-arrival at each value of the Doppler translation $\Delta$ is extracted from the three antenna samples, and a running average over several 256-second samples is computed. The relationship used to obtain these angles is:

$$\alpha_{1,2} = \sin^{-1}\left[\frac{-\tan^{-1}\frac{Im(x_{1,2})}{Re(x_{1,2})}}{\frac{\pi}{2}}\right].$$

where $X_{1,2}$ are defined in terms of the complex Fourier transforms of the signals $V_A$, $V_B$, $V_C$ at the three antennas A, B, and C (for a given Doppler translation $\Delta$) as $$x_{1,2} = \frac{(|V_C|^2 - |V_A|^2) \pm i\sqrt{4V_C V_B^* - V_B V_A^{*2} - (V_C^2 - V_A^2)^2}}{2(V_C^* V_B - V_B^* V_A)}$$

The amplitude of the signals arriving from the two directions is given by $$A_{1,2} = \frac{V_A x_{2,1} - V_B}{(x_{2,1} - x_{1,2})}$$

in the second step 71, a curve is fit to the data points giving Doppler translation $\Delta$ versus azimuthal angle-of-arrival $\alpha$ for each range gate. In the third step 73, each grid point at coordinates x,y on the desired map is then converted to range r and azimuthal angle $\alpha$ (i.e. polar coordinates) for each radar location. In the fourth step 75, interpolation procedures are used to find the proper range gate samples. In the fifth step 77, the Doppler translation $\Delta$ is found at the desired grid point from the digital "curve" or array of Doppler translation $\Delta$ versus azimuthal angle $\alpha$. From this, in the sixth step 79 the radial component of the surface current vector u at that grid point is found from the relation $u = v\Delta$. These radial component values are then stored until in the last step, 81, they can be combined trigonometrically with those from the second radar site to produce the final output, a current-vector map.

In an actual model of the preferred embodiment, all radar and digital gear is contained in shock-mounted fiberglass cases, only 44 inches high and weighing under 200 pounds. The radar antennas are easily erectable frames holding three vertical aluminum pipes; the entire system can be set up in less than an hour. System performance shows that a radar pair can provide surface current data to a range from the coast of about 70 Km. with an optimum spacing between paired radar units of 40 Km.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of mapping surface current vectors in coastal waters comprising the steps of:
   (a) scattering radio signals from a first radar site off waves in coastal waters to produce Doppler echos at a first radar site;

(b) sampling versus time after transmission to establish at each of different ranges from said site the Doppler echos from all directions from at least three receiving antennas to constitute a time sample;

(c) computing the range by determination of time between transmission and reception of scattered radio signals within a constant radius arc of said omni-directional sampling of step (b), corresponding to each of said time samples;

(d) measuring the coastal waters surface current components of the Doppler shift of the echos from each of the antennas in each said time sample;

(e) determining the azimuthal angles of arrival of the Doppler echos from each of the antennas in each time sample for each of said measured surface current-produced components of the Doppler shift;

(f) predetermining a plurality of map grid points to correspond to different values of range and said azimuthal angles of arrival thereat;

(g) interpolating from the values of the Doppler shift components measured in step (d) a surface current-produced component of the Doppler shift for each of said grid points;

(h) determining from the angular determinations in step (e) and said Doppler shift components found in step (g) the respective surface current vector component radial to the first radar site for each of said map grid points to constitute a first set of radial surface current vector components;

(i) repeating steps (a) through (h), contemporaneously therewith, at a second radar site to determine a second set of radial surface current vector components constituting the respective surface current vector components radial to the second radar site at each of said map grid points; and (j) combining trigonometrically grid point correspondent radial surface current vector components of said first set and radial surface current vector components of said second set to extract thereby a complete surface current vector for each said map grid points and construct therefrom a map of the surface current field of the coastal waters.

2. The method recited in claim 1 wherein the surface current-produced components of the Doppler shift measuring step includes the steps of:
determining the total Doppler shift of the echos; subtracting therefrom the Doppler shift due to scattering of the radio signals by gravity waves of resonant length on a stationary water surface; and
normalizing the result of the substracting step relative to the Doppler shift due to scattering of the radio signals by gravity waves of resonant length on a stationary water surface.

3. The method recited in claim 1 wherein the azimuthal angles of arrival determining step includes the step of:
measuring the phase difference between signals received by at least three spaced apart antennas at the first radar site.

4. The method recited in claim 2 wherein the surface current vector component determining step includes the step of:
multiplying the normalized result of the subtracting step by the velocity of the gravity waves of resonant length on a stationary water surface.

5. Apparatus for mapping surface current velocity vectors in coastal waters comprising a pair of pulsed radar transceivers respectively positionable at two spaced apart sites for scattering signals from said sites off waves in coastal waters to produce Doppler echos at each of said sites and sampling versus time after transmission at each of different ranges from each said site the Doppler echos from all directions, said ranges being computed in accordance with said signals times of flight, said transceivers comprising at least three spaced apart omni-directional receiving antennas at each of said two sites, means at each of said two sites for receptively connecting said antennas to a respective transceiver in time sequence during consecutive pulse transmissions and sampling from all said antennas at each range constituting a time sample, further means to measure the coastal waters surface current-produced components of the Doppler shift of the echos from each of the antennas in each said time sample, still further means to determine the azimuthal angle of arrival of the Doppler echos from each of the antennas in each time sample for each of said measured surface current-produced components of the Doppler shift, and yet still further means for determining, in accordance with said azimuthal angles and surface current-produced components, the surface current vector components radial to each of said sites and trigonometrically combining said radial components to produce realtime representations of complete surface current vectors.

* * * * *